US010992790B2

(12) United States Patent
Patel et al.

(10) Patent No.: US 10,992,790 B2
(45) Date of Patent: Apr. 27, 2021

(54) VEHICLE INTER-CONTROLLER COMMUNICATION

(71) Applicant: STEERING SOLUTIONS IP HOLDING CORPORATION, Saginaw, MI (US)

(72) Inventors: Keyur R. Patel, Saginaw, MI (US); Vinod Shankar Naganathan, Saginaw, MI (US); Travis E. Waineo, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 42 days.

(21) Appl. No.: 15/683,047

(22) Filed: Aug. 22, 2017

(65) Prior Publication Data
US 2018/0063301 A1    Mar. 1, 2018

Related U.S. Application Data

(60) Provisional application No. 62/378,426, filed on Aug. 23, 2016.

(51) Int. Cl.
*H04L 29/14* (2006.01)
*H04L 1/00* (2006.01)
(Continued)

(52) U.S. Cl.
CPC ............ *H04L 69/40* (2013.01); *H04L 1/0041* (2013.01); *H04L 1/0061* (2013.01); *H04L 1/22* (2013.01); *H04L 43/18* (2013.01); *H04L 69/08* (2013.01)

(58) Field of Classification Search
CPC ......... H04L 69/40; H04L 69/08; H04L 43/18; H04L 1/0041; H04L 1/0061;
(Continued)

(56) References Cited

U.S. PATENT DOCUMENTS

| 4,985,895 A | * | 1/1991 | Pelkey | G06F 11/10 |
| | | | | 340/12.51 |
| 6,546,025 B1 | * | 4/2003 | Dupuy | H04J 3/0605 |
| | | | | 370/509 |

(Continued)

FOREIGN PATENT DOCUMENTS

CN    105373111 A    3/2016

OTHER PUBLICATIONS

Chinese Office Action and Search Report from related Chinese Application No. 201710731051.5 dated Mar. 24, 2020, 5 pages.

*Primary Examiner* — Un C Cho
*Assistant Examiner* — Kenan Cehic
(74) *Attorney, Agent, or Firm* — Dickinson Wright PLLC

(57) ABSTRACT

Technical solutions are described for inter-controller communication in a protocol agnostic manner. For example, a method includes generating, by a sending controller, a protocol agnostic data frame including a pattern identifier, a rolling counter, a message identifier, a signal group, a cyclic redundancy check (CRC), a complement of the pattern identifier, and a complement of the rolling counter. The method further includes sending, by the sending controller, the protocol agnostic data frame to a first receiving controller that uses a first communication protocol, and sending, by the sending controller, the protocol agnostic data frame to a second receiving controller that uses a second communication protocol.

20 Claims, 7 Drawing Sheets

(51) Int. Cl.
*H04L 1/22* (2006.01)
*H04L 12/26* (2006.01)
*H04L 29/06* (2006.01)

(58) Field of Classification Search
CPC ......... H04L 1/0063; H04L 1/22; H04L 1/004;
H04L 1/0083; H04L 12/40; H04L
2012/40215; G05B 23/0213
See application file for complete search history.

(56) References Cited

U.S. PATENT DOCUMENTS

| | | | | |
|---|---|---|---|---|
| 6,690,733 | B1* | 2/2004 | Baumgartner | H04L 1/0061 375/224 |
| 7,778,610 | B2* | 8/2010 | Staszewski | H03B 21/00 327/156 |
| 7,805,122 | B2* | 9/2010 | Lerner | H03B 21/00 327/156 |
| 8,121,214 | B2* | 2/2012 | Tal | H03B 21/02 370/206 |
| 2002/0071421 | A1* | 6/2002 | Chiu | H04L 1/1809 370/349 |
| 2005/0018615 | A1* | 1/2005 | Itoh | H04L 12/1881 370/252 |
| 2006/0200641 | A1* | 9/2006 | Insley | H04L 1/1607 711/163 |
| 2011/0150066 | A1* | 6/2011 | Fujimoto | H04B 7/086 375/224 |
| 2014/0328357 | A1* | 11/2014 | Fredriksson | H04J 3/0614 370/520 |
| 2015/0046775 | A1* | 2/2015 | Prodan | H04L 1/0076 714/776 |
| 2016/0112325 | A1* | 4/2016 | Lopez | H04L 63/0218 370/235 |
| 2016/0164693 | A1* | 6/2016 | Choi | H04L 12/2809 370/474 |
| 2016/0269148 | A1* | 9/2016 | Kim | H04L 1/0045 |
| 2017/0019382 | A1* | 1/2017 | Jain | H04L 12/40 |
| 2017/0099067 | A1* | 4/2017 | Smith | H04L 1/0056 |
| 2017/0099119 | A1* | 4/2017 | Rison | H04L 1/0041 |
| 2017/0111257 | A1* | 4/2017 | Nozawa | H04L 41/0686 |
| 2017/0155458 | A1* | 6/2017 | He | H04L 69/22 |
| 2018/0063301 | A1* | 3/2018 | Patel | H04L 1/0061 |

* cited by examiner

VEHICLE INTER-CONTROLLER COMMUNICATION

CROSS-REFERENCES TO RELATED APPLICATIONS

This patent application claims priority to U.S. Provisional Patent Application Ser. No. 62/378,426, filed Aug. 23, 2016, which is incorporated herein by reference in its entirety.

BACKGROUND

This application generally relates to communication between electronic control units (ECUs) in a vehicle, and particularly between one or more ECUs associated with an electric power steering (EPS) system in the vehicle and other ECUs in the vehicle.

Increasing reliance on automatic driving assist systems (ADAS) has resulted in one or more controllers of various subsystems in a vehicle to communicate with each other. For example, the communication facilitates the subsystems to share information, in turn facilitating a subsystem to react to actions being taken by other subsystems automatically.

In addition, increasing vehicle safety requirements are driving system redundancy to achieve higher safety levels. Redundancy is achieved by proliferation of the control system of the vehicle, to the extent of having redundant ECUs. This in turn demands a robust and failsafe communication method between the two ECUs. A poor communication link between ECUs has an adverse effect on the overall system performance, leading to a safety hazard.

Accordingly, it is desirable to have a robust inter-controller communication.

SUMMARY

Technical solutions are described for facilitating electronic control units (ECUs) in a vehicle to have a robust inter-controller communication. For example, an ECU, such as in a steering system, packages data in a protocol agnostic data frame, and transmits the protocol agnostic data frame on multiple communication channels to one or more other ECUs. The ECU may transmit the protocol agnostic data frame to another ECU in a redundant manner.

One or more examples are described of a computer implemented method for inter-controller communication. The method includes generating, by a sending controller, a protocol agnostic data frame including a pattern identifier, a rolling counter, a message identifier, a signal group, a cyclic redundancy check (CRC), a complement of the pattern identifier, and a complement of the rolling counter. The method further includes sending, by the sending controller, the protocol agnostic data frame to a first receiving controller that uses a first communication protocol, and sending, by the sending controller, the protocol agnostic data frame to a second receiving controller that uses a second communication protocol.

One or more examples are described of a communication system including a first controller that uses a first communication protocol. The first controller communicates with multiple receiving controllers in a protocol agnostic manner by generating a protocol agnostic data frame including a pattern identifier, a rolling counter, a message identifier, a signal group, a cyclic redundancy check (CRC), a complement of the pattern identifier, and a complement of the rolling counter. The first controller further sends the protocol agnostic data frame to a second controller that uses a second communication protocol, and sends the protocol agnostic data frame to a third controller that uses a third communication protocol.

Further, one or more examples are described for a computer program product including non-transitory computer readable medium having computer executable instructions. The computer executable instructions cause controllers in a communication system to communicate in a protocol agnostic manner by generating, by a first controller that uses a first communication protocol, a protocol agnostic data frame including a pattern identifier, a rolling counter, a message identifier, a signal group, a cyclic redundancy check (CRC), a complement of the pattern identifier, and a complement of the rolling counter. Further the communication includes sending, by the first controller, the protocol agnostic data frame to a second controller that uses a second communication protocol, and sending, by the first controller, the protocol agnostic data frame to a third controller that uses a third communication protocol These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
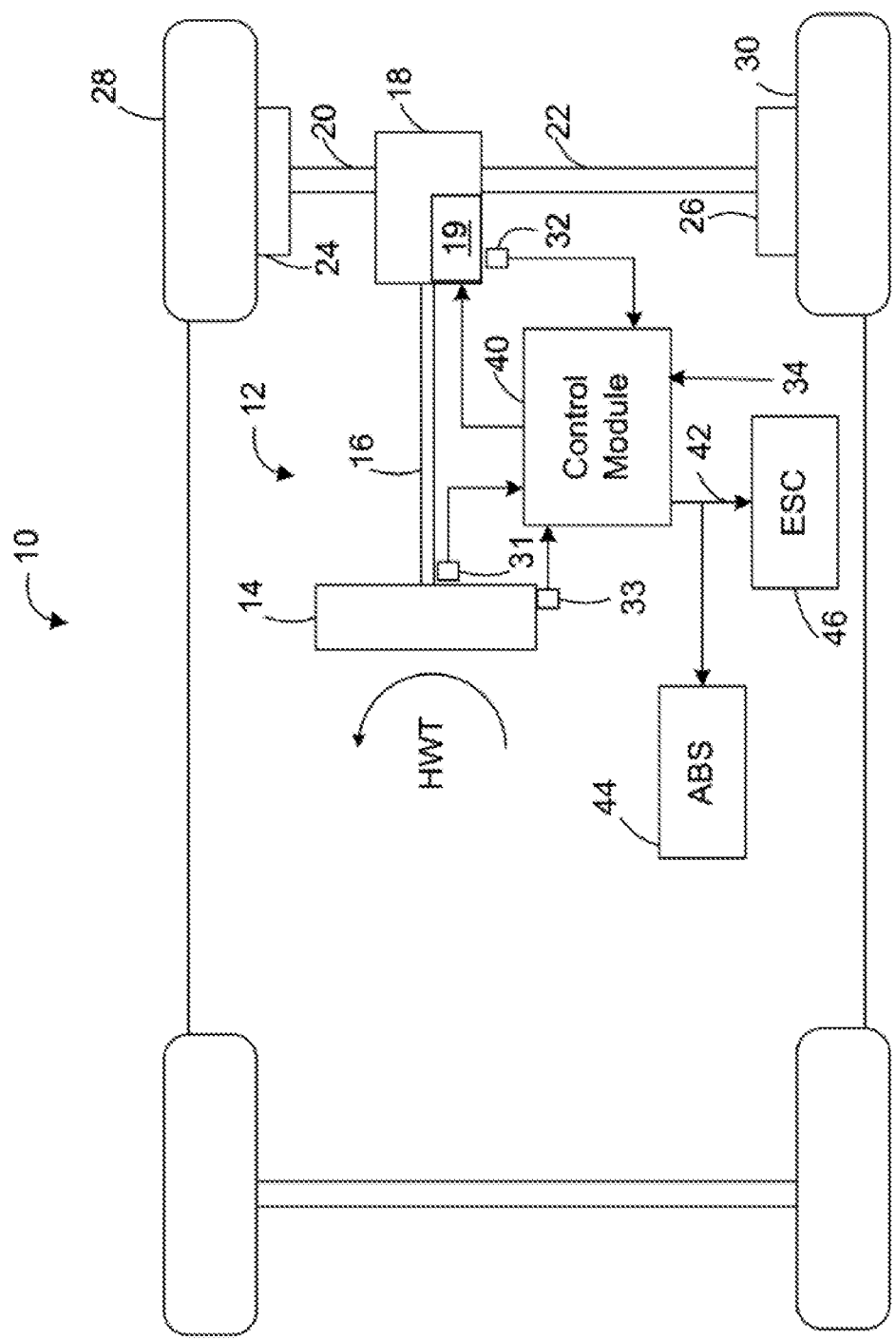
FIG. 1 illustrates a vehicle including a steering system, according to one or more embodiments.

Referring now to the Figures, where the invention will be described with reference to specific embodiments, without limiting same, FIG. 1 is an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein.

Communication with the ABS 44, ESC system 46, and other systems (not depicted), can be performed using, for example, a controller area network (CAN) bus or other vehicle network known in the art to exchange signals such as the vehicle speed signal 34. In one or more examples, hardware limitations and diversification of communication channels drive the inter-micro communication links to use different protocols, for example CAN, Serial Communications Interface (SCI), Multi-Processor Link Interface (MLI), among others. Each protocol may satisfy a portion of the safety aspects of data handling, but does not inherently ensure all safety aspects are covered.

The control module 40 may be an ECU. The vehicle 10 includes additional ECUs The control module 40 receives information from the other ECUs, such as the vehicle speed signal 34, the sensor information, and various other information. As described earlier, there are multiple communication methods designed for inter-micro communication, such as the protocols SCI, CAN, and MLI, among others.

Each protocol may satisfy a portion of the safety aspects of data handling, but does not inherently ensure that all safety aspects are covered.

Safety aspects of data handling for inter-micro communication include detecting stale data, for example old data frame being received after a delay. Safety aspects further include detecting that the communications missed data, for example because of a missed data frame. Further, the safety aspects include detecting extraneous data, for example receiving same data frame twice (or more). The safety aspects further include detecting loss of data integrity, for example a flipped bit during transmission. The safety aspects further include detecting loss of data consistency, for example by detecting a clear start and stop indicators for a data frame. Further yet, the safety aspects include detecting incomplete data communication, for example because of a missed signal, or transmission unit or data frame. Safety aspects further include detecting data swapping caused by a swapped signal. Thus, a technical challenge exists for the controller 40 to communicate with other controllers in the vehicle 10 using inter-micro communication that facilitates implementing at least the above safety aspects.

Further, there is no standardized data handling method that works with all protocols. Typically, hardware limitations and diversification of communication channels drive an inter-micro communication link to use at least two different protocols. For example, a first controller, say the controller 40 of the EPS 12 uses CAN communication protocol with a first type of package structure while a second controller, say of the ABS 44 uses the CAN protocol with a second type of package structure. Alternatively, the controllers may use different package structures with an underlying SCI protocol at the physical layer. Each protocol, the CAN and the SCI, has built in safety aspects, but implementing the safety aspects, such as those described above poses a technical challenge when the inter-micro communication includes translation between multiple types of the protocols being used by the controllers, as in this case. It should be noted that in other examples, the controllers in the inter-micro communication, and the protocols being used by the controllers may be different than those in the above example.

Further yet, it should be noted that while the above example has the two controllers from separate vehicle submodules, in one or more examples, the two controllers may be part of the same control module, for example the control module 40 of the EPS 12. The two controllers within the same control module 40 facilitate redundancy for the control module 40, so that if the first controller fails, the second controller picks up the operation, or vice versa.

The technical solutions described herein address at least the above described technical challenges in inter-micro communication. The technical solutions described herein facilitate a standard data handling method, which covers all the predetermined safety aspects for inter-micro communication, and further facilitate using multiple protocols concurrently. Further, the technical solutions described herein are robust against failure of one or more communication channels. Additionally, the technical solutions described herein facilitate latency for runtime arbitration between channels to be below a predetermined threshold. Further, the technical solutions described herein facilitate communication to be arbitrated on a "message replacement" basis. For example, if an integrity check fails on one channel, that message is sourced from a second channel, which may use a different protocol implementation.

Figure 2:
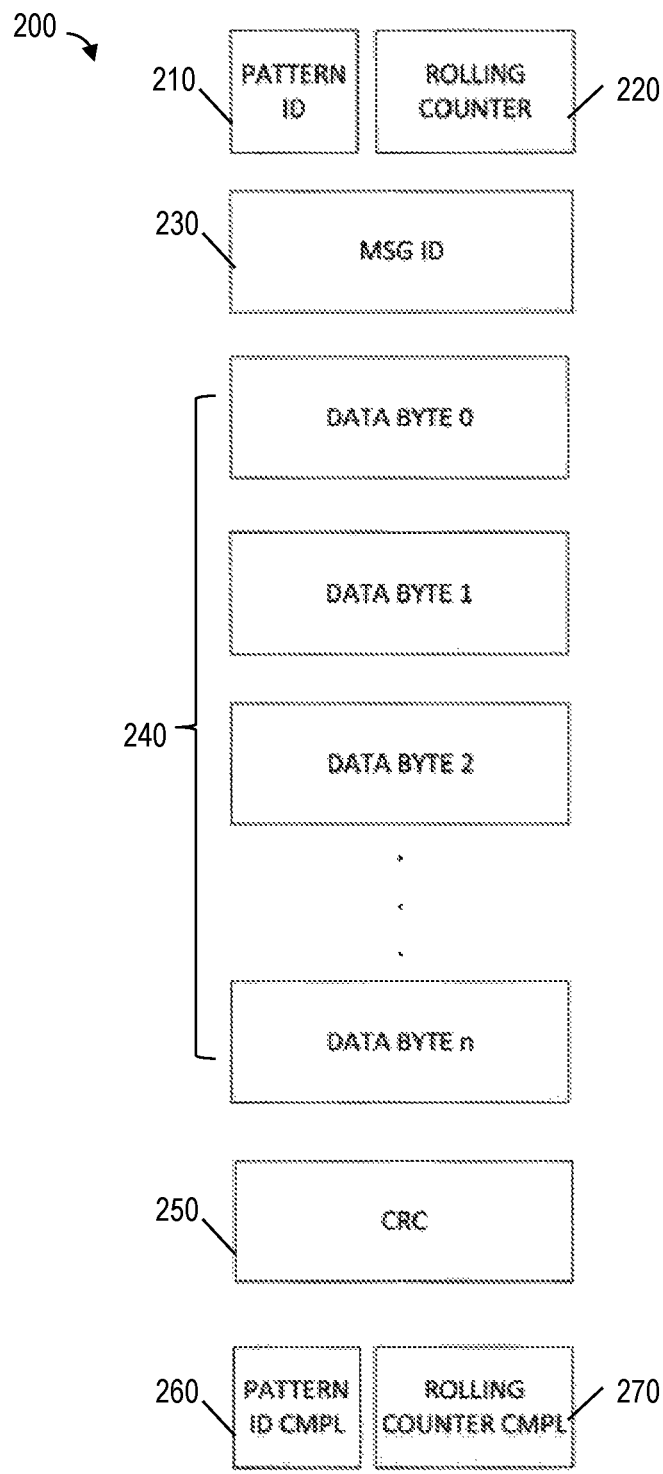
FIG. 2 illustrates an example protocol agnostic data frame, according to one or more embodiments.
Figure 3:
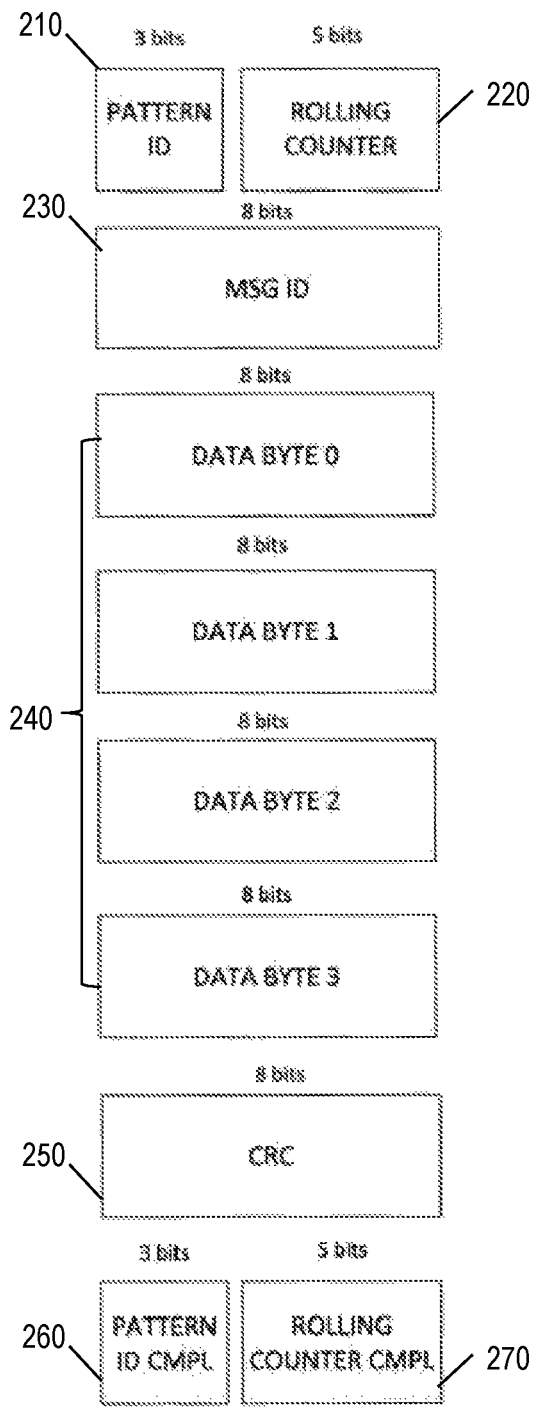
FIG. 3 illustrates an example protocol agnostic data frame, according to one or more embodiments.

FIG. 2 illustrates a data frame for the inter-micro communication according to one or more embodiments. FIG. 3 illustrates an example data frame generated according to the generic data frame illustrated in FIG. 2. By following the communication protocol using the data frame of FIG. 2, the technical solutions facilitate identifying communication issues such as stale data—old data frame; missed data—missed data frame; extraneous data—unexpected data frame; data integrity—flipped bit; data consistency—clear start and stop of data frame; incomplete data—missed signal; data swapping—swapped signal. Information transmitted according to such a frame can be transmitted across multiple protocols. Further, using such frames facilitates communication to be arbitrated on a "message replacement" basis. It should be noted that the examples herein use the controller 40 of the EPS 12 of the vehicle 10 implementing the technical solutions described herein, however other controllers in the vehicle 10 may be used instead in other examples.

The controller 40 during the inter-micro communication generates a data frame 200 according to the format depicted in FIG. 2. The data frame 200 includes a pattern identifier 210. The pattern identifier 210 specifies a start of the data frame 200 to synchronize data on asynchronous communication protocols such as SCI. In asynchronous communication protocols, the pattern identifier 210 is bypassed. In one or more examples, as shown in FIG. 3, the pattern identifier 210 is a 3-bit value (eg: 101).

The data frame 200 further includes a rolling counter 220, which is used to monitor for new data. The receiving controller uses the rolling counter 220 to determine if the received data frame is new data using a rolling counter algorithm/module. For example, if the rolling counter 220 has been updated, the data is new. If the rolling counter 220 maintains the same value, the data is old. As shown in FIG. 3, the rolling counter 220 is a 5-bit value in one or more examples. To use the rolling counter 220 both the sender and the receiver controllers move forward in the sequence of counters. The sender controller and receiver controller maintain respective rolling counter values. If the sender has sent the nth counter value earlier, then it sends the (n+1)th next. Contrarily, if the receiver has seen the nth code it only accepts the (n+1)th code or some later rolling counter value. If the rolling counter value received is smaller than or equal to the nth code the receiver has already seen, the receiver identifies the data frame 200 as a duplicate, and ignores the data frame 200. It should be noted that the above is just one example of using the rolling counter 220 to determine if the received data is stale, and that in other examples, other algorithms may be used.

The data frame 200 further includes a message identifier 230. The message identifier 230 is an identifier for the signal group 240.

The data frame 200 includes the signal group 240 that includes one or more signals, for example including data bytes 0-n. The data bytes contain information that is transmitted across from one controller to another. Typically, the data count is based on a maximum number of signals to which a communication protocol limits a message. The data frame 200 provided herein is flexible to handle any number of signals in the signal group and thus can be used across multiple protocols having varied limits on the number of signals. The receiving controller repackages the data frame 200 according to a protocol used by the receiving controller upon receipt, and subsequently executes the integrity checks on the repackaged message. This further allows the format of the data frame 200 to be applicable for multiple protocols. As shown in the FIG. 3, the signals are 8 bits each and the payload signal group 240 includes four signals i.e. 4-bytes each in this example. It is understood that in other examples, the sizes of the signals are different and also that the number of signals in the signal group 240 is different.

In one or more examples, the message identifier 230 identifies separation of signals in the signal group 240. For example, the message identifier indicates one or more bit/byte positions in the signal group 240 where a signal starts and/or ends. For example, if in the illustration of FIG. 3, each data byte is a separate signal, the message identifier 230 indicates that signal group 240 includes n signals with first signal at bit 0, a second signal at bit 8, a third signal at bit 16, and so on for each of the n signals. In one or more examples, the message identifier indicates the individual signals in the signal group 240 by providing positions and sizes of the signals in the signal group 240.

The data frame 200 further includes a cyclic redundancy check (CRC) value 250. In one or more examples, the CRC is calculated based on the message identifier 230 and the signals in the signal group 240. This CRC 250 being based on these values ensures the integrity of the information being transmitted irrespective of the protocols being used by the sending and receiving protocols. The pattern identifier 210 and the rolling counter 220 are protected by comparing to the corresponding complement values 260 and 270, and therefore are not included in the CRC field 250. Because the CRC 250 is for the signal group 240 that may vary in size from one data frame to another, the CRC 250 is based on the size of the signal group 240. The example data frame shown in FIG. 3 uses an 8-bit CRC value, however in other examples the CRC 250 may include a different number of bits.

The data frame 200 further includes a pattern identifier complement (CMPL) 260 and a rolling counter complement 270. The pattern identifier complement 260 and the rolling counter complement 270 are used to identify the end of the data frame 200, and also for checking the data reception. If the start of the data frame 200 (pattern identifier 210 and the rolling counter 220) and the corresponding complements 260-270 when XOR'd with each other equal all ones, then the full data frame 200 has been captured and can be passed on for rolling counter and CRC checks. Otherwise, there has been an error in capturing the data frame 200. In the example of FIG. 3, the pattern identifier complement 260 is 3-bits and the rolling counter complement 270 is 5 bits, however in other examples any one or both the fields may include a different number of bits.

Thus, by generating the data frame 200 as described herein, inter-micro communication in the vehicle 10 implements the safety aspects by being protocol independent/agnostic. The pattern identifier 210 and the rolling counter 220, and the corresponding complement values 260-270, detect data consistency issues during communication of the data frames. The rolling counter 220 detects stale, missed, and extraneous data issue. The CRC 250 detects incomplete data, data swapping, and data integrity issues. Further, as described herein, since the data frame 200 may have multiple data bytes, without a limitation on data size, the data frame 200 facilitates multiple protocol compatibility.

Figure 4:
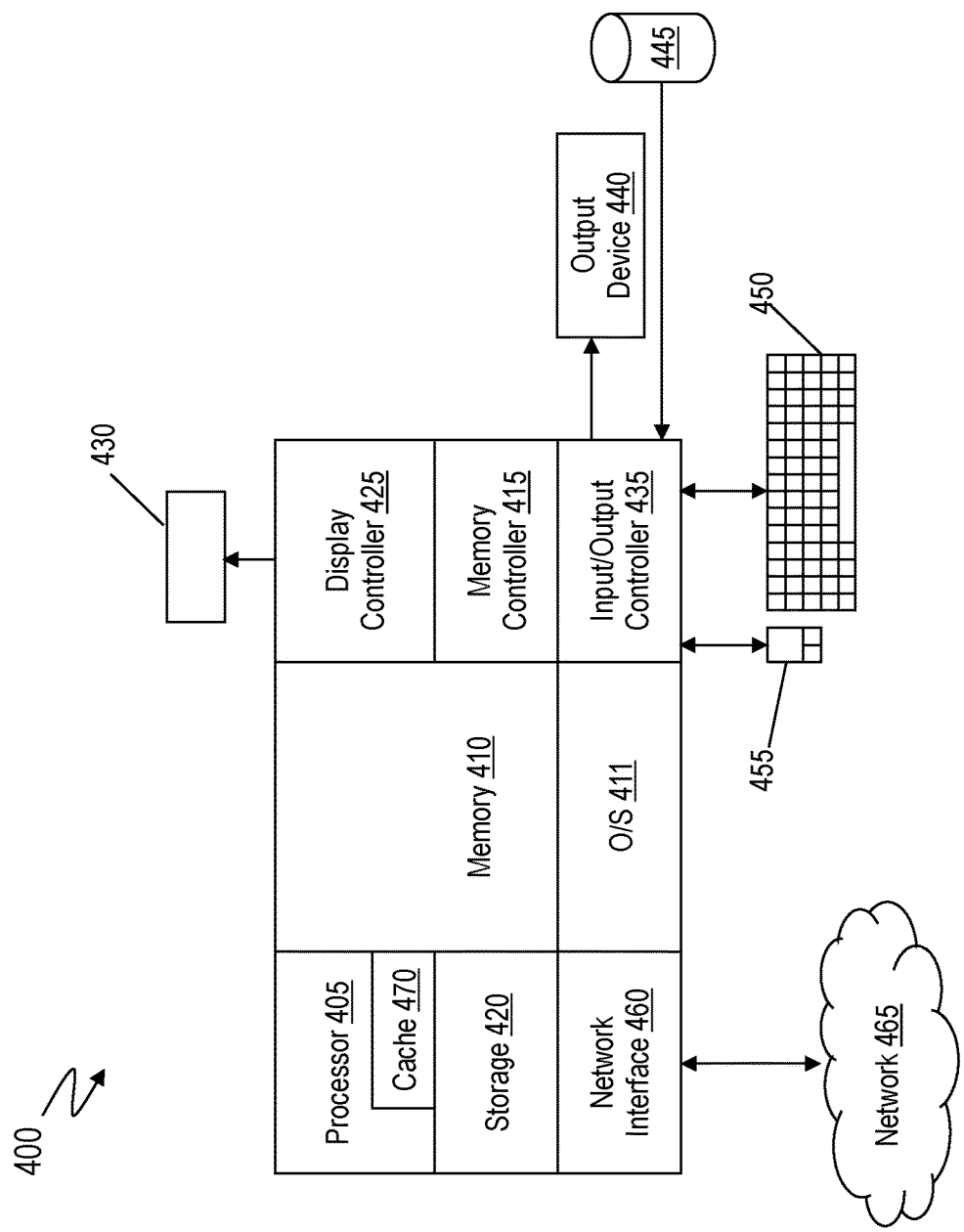
FIG. 4 illustrates an example communication system according to one or more embodiments.

FIG. 4 illustrates an example communication system 400 in a vehicle. The system 400 includes the controller 40, or any other device that communicates via an intra-vehicle network 465, such as using the CAN, SCI, MLI protocols. The system 400 includes hardware, such as electronic circuitry.

The system 400 includes, among other components, a processor 405, memory 410 coupled to a memory controller 415, and one or more input devices 445 and/or output devices 440, such as peripheral or control devices, that are communicatively coupled via a local I/O controller 435. These devices 440 and 445 may include, for example, battery sensors, position sensors (altimeter, accelerometer, GPS), indicator/identification lights and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, and so on.).

The memory 410 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services. In one or more examples, the OS 411 is a real-time operating system (RTOS).

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the systems and methods described herein.

The system 400 may further include a display controller 425 coupled to a user interface or display 430. In some embodiments, the display 430 may be an LCD screen. In other embodiments, the display 430 may include a plurality of LED status lights. In some embodiments, the system 400 may further include a network interface 460 for coupling to a network 465. The network 465 may be an IP-based network for communication between the system 400 and an external server, client and the like via a broadband connection. In an embodiment, the network 465 may be a satellite network. The network 465 transmits and receives data between the system 400 and external systems. In some embodiments, the network 465 may be a managed IP network administered by a service provider. The network 465 may be implemented in a wireless fashion, for example, using wireless protocols and technologies, such as WiFi, WiMax, satellite, or any other. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), an intra-vehicle network, intranet or other suitable network system and may include equipment for receiving and transmitting signals. The network may use one or more protocols such as the CAN, SCI, MLI, and the like.

Figure 5:
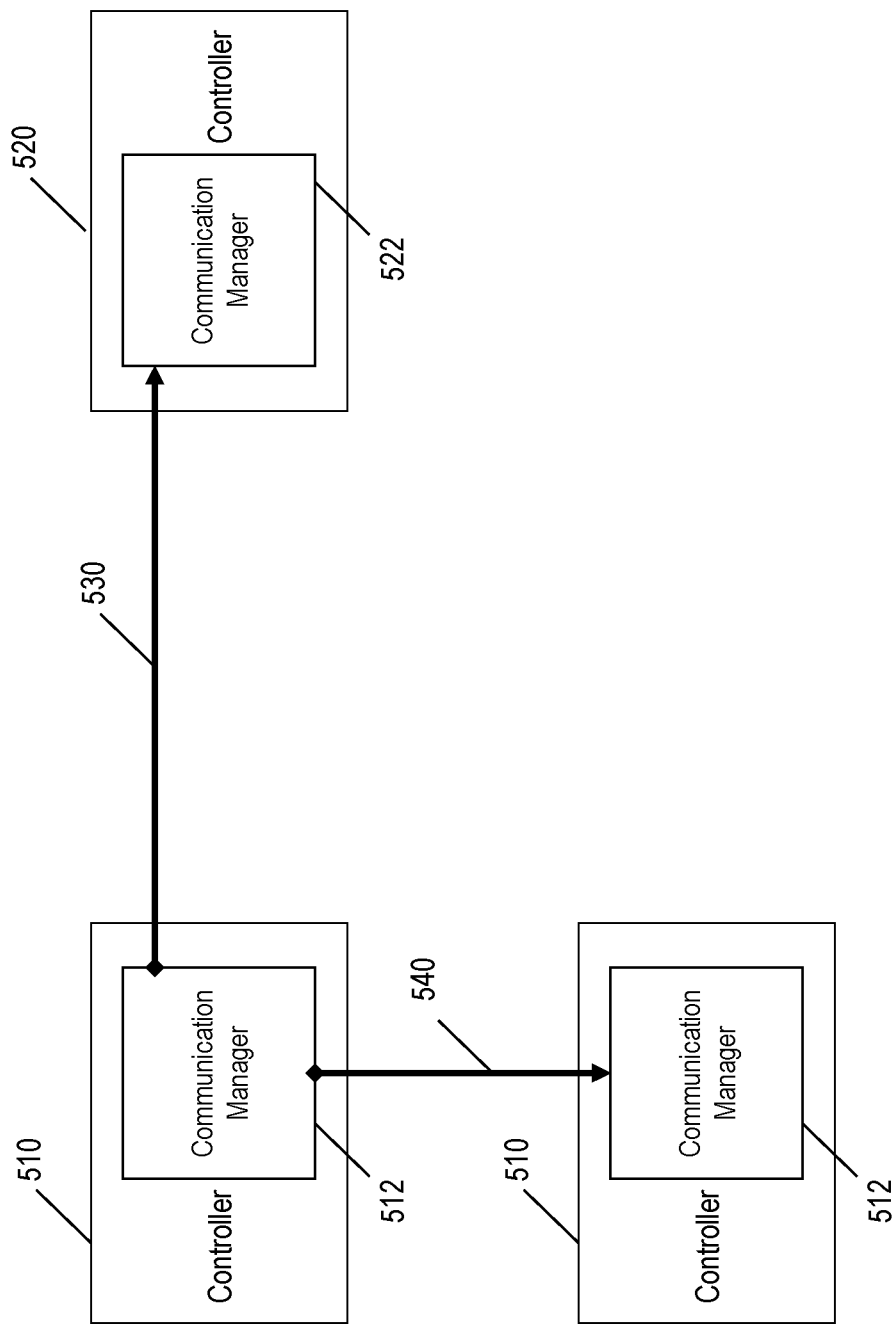
FIG. 5 depicts a communication system according to one or more embodiments

FIG. 5 depicts a communication system according to one or more embodiments. The communication system 500 depicts two controllers, a first controller 510 and a second controller 520 communicating with each other, such as in an intra-vehicle environment. For example, the first controller 510 may be the controller 40 of a steering system, and the second controller 520 may be the controller of the ABS module 44 of the vehicle 10. In one or more examples, the controllers 510-520 may include components similar to those of the system 400. For example, the controllers include respective network interfaces 512 and 522. Alternatively, or in addition, the first controller 510 and the second controller 520 are both part of the control module 40 of the EPS 12 (or any other vehicle sub-system) and the communication between the two controllers is to facilitate the control module 40 to provide redundancy in case one of the two controllers 510-520 experience a failure.

The first controller 510 sends a message 530 to the second controller 520 via the network interfaces 512 and 522. The first controller 510 uses a first protocol implementation different from a second protocol implementation used by the second controller 520, for example because of hardware restrictions. Accordingly, the first controller 510 generates a first message using the first protocol. The first network interface 512 repackages the first message using the protocol agnostic data frame 200 to generate the message 530. The first network interface transmits the protocol agnostic message according to the data frame 200 to the second controller 520.

The second network interface 522, upon receipt of the message 530, checks the contents using the package identifier 210 and rolling counter 220 (using respective complements). For example, the receiving controller 520 may detect stale data if the rolling counter 220 based on a rolling counter validation algorithm. For example, the algorithm checks if the rolling counter 220 repeats a value. Alternatively, or in addition, the receiving controller 520 may detect missed data if the rolling counter 220 skips one or more values or based on any other technique used in the rolling counter algorithm.

Further, the CRC 250 is used to check data integrity. For example, the receiving controller 520 may detect extraneous data if pattern identifier 210 fails and/or in case of a rolling counter 220 mismatch, or if the CRC 250 check fails. The receiving controller 520 may further detect data consistency issues if the CRC check fails. For example, the receiving controller 520 determines that incomplete data has been received in case the pattern identifier check fails and/or the CRC check fails. Further, the receiving controller 520 may detect data swapping if the CRC check fails.

Further, the second network interface reconstitutes the signal group 240 using a message format according to the second protocol used by the second controller 520. In one or more examples, the message 530 results in more than one second protocol messages at the second controller 520. The second controller 520 then uses the reconstituted message(s).

In one or more examples, the first controller 510 generates multiple data frames 530 and 540 as described herein and transmits the multiple messages 530-540 using the protocol agnostic data frame 200 across all available communication channels, thus facilitating for seamless transition between controllers. For example, the first controller 510 sends the message 530 to the second controller 520 that uses a second protocol, and in addition a message 540 that contains the same information as the message 530 to a third controller 520B that uses a third protocol. Alternatively or in addition, the ECU generates a single data frame 200 and transmits copies of the data frame 200 across all available channels, for example as the message 530 and the message 540.

Figure 6:
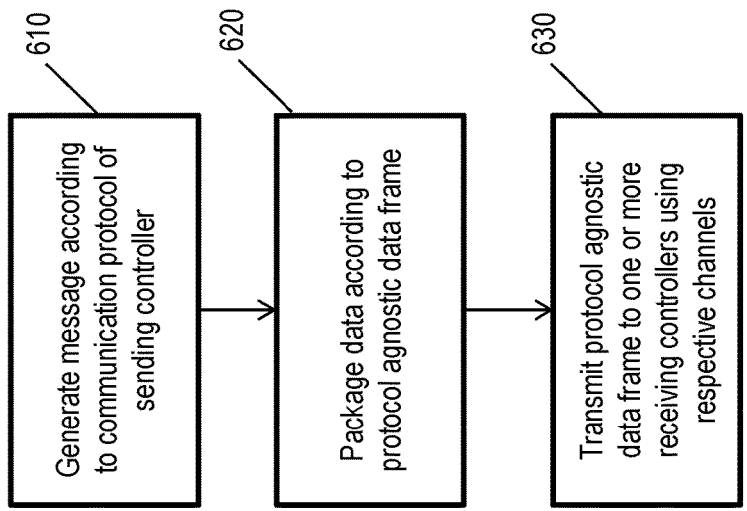
FIG. 6 illustrates an example flowchart of a method for transmitting protocol agnostic data frame, according to one or more embodiments.

FIG. 6 illustrates an example flowchart of a method for transmitting protocol agnostic data frame, according to one or more embodiments. The sending controller 510 generate a message according to communication protocol of sending controller, the first protocol, as shown at block 610. The sending controller 510 further packages the data from the message according to protocol agnostic data frame 200, as shown at block 620. Further, the sending controller 510 transmits the protocol agnostic data frame 200 to one or more receiving controllers 520 using respective communication channels, as shown at block 630. Thus, the sending controller 510 generates and sends copies of the same protocol agnostic data frame to multiple receiving controllers irrespective of the different protocols being used by the receiving controllers 520.

Figure 7:
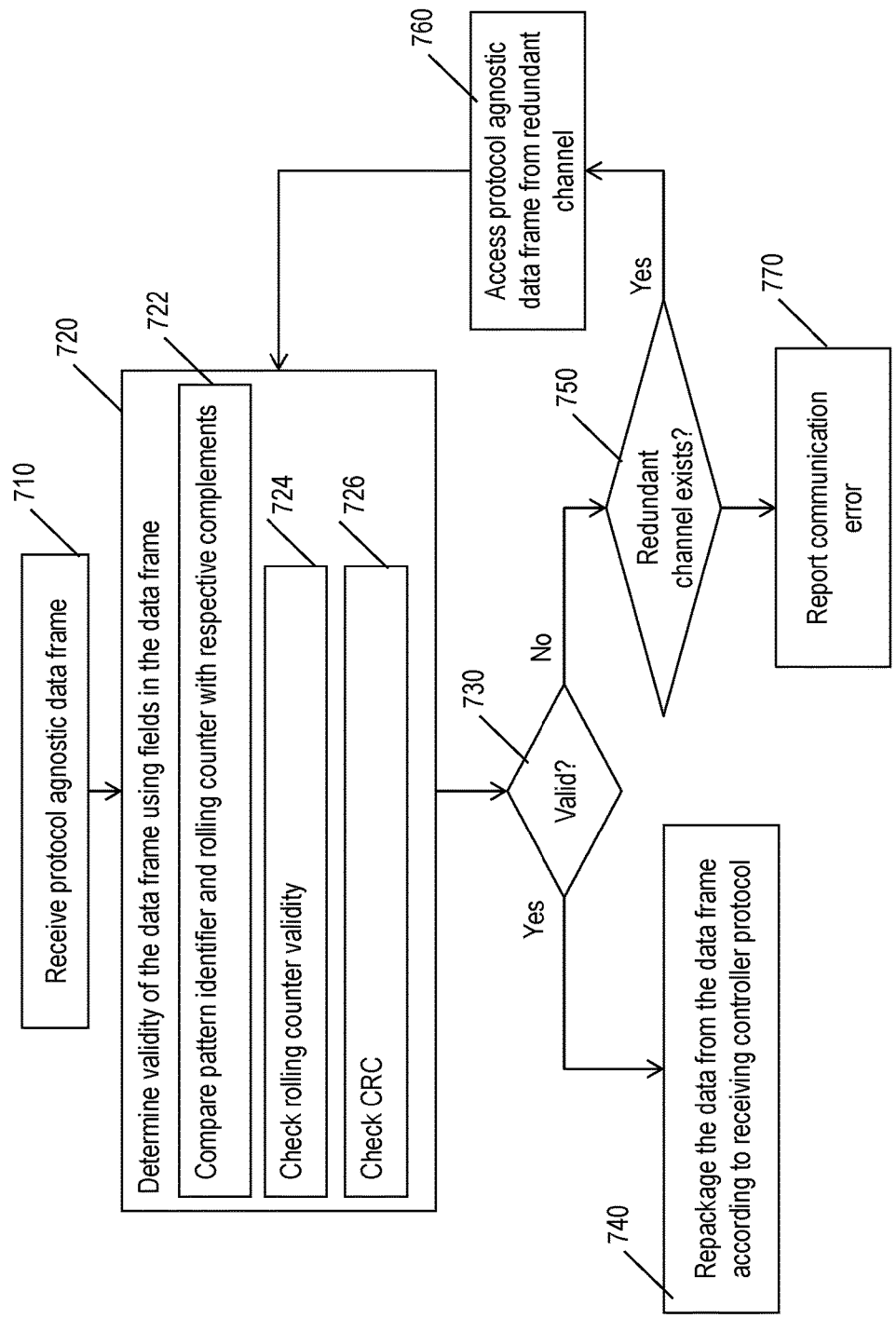
FIG. 7 illustrates an example flowchart of a method for receiving protocol agnostic data frame, according to one or more embodiments.

FIG. 7 illustrates an example flowchart of a method for receiving protocol agnostic data frame, according to one or more embodiments. The receiving controller 520 receives a protocol agnostic data frame 200, as shown at block 710.

The receiving controller 520, in response, determines validity of the data frame 200 using fields in the data frame 200, as shown at block 720. For example, the pattern identifier 210 and rolling counter 220 are compared with respective complements 260-270, as shown at block 722. For example, an XOR operation is performed on the pattern identifier 210 and the pattern identifier complement 260. If the result is not all ones, the data frame 200 is considered invalid. In one or more examples, if the pattern identifier check results in the data frame being valid, the rolling counter 220 and the rolling counter complement 270 are XORed. If this result is not all ones, the data frame 200 is considered invalid. In one or more examples, the pattern identifier 210 and the rolling counter 220 are XORed with the corresponding complements 260-270 in a single operation.

Further, the rolling counter 220 validity is checked with a rolling counter value of the receiving controller 520, as shown at block 724. Further yet, the CRC 250 of the data frame 200 is used to check data integrity of the signal group 240 and the message identifier 230, as shown at block 726.

If the validity checks are all successful, the network interface 522 of the receiving controller 520 repackages the data from the signals from the data frame 200 according to receiving controller protocol, as shown at block 740 and 750. The receiving controller 520 accesses and uses the data from the reconstituted messages in the receiving controller protocol format. In one or more examples, the data from the signal group 240 is extracted into separate signals based on the positions and sizes of each signal provided by the message identifier 230.

Alternatively, if the validity check of the data frame 200 fails, the receiving controller 520 checks if a redundant channel exists on which the data frame 200 has been sent, as shown at block 730 and 750. If a redundant channel does exist, the receiving controller 520 accesses a copy of the protocol agnostic data frame 200 from the redundant channel, as shown at block 760. The copy of the data frame 200 is processed as described earlier, as shown at block 720.

In case no more redundant copies of the data frame 200 are not available for access by the receiving controller 520, the receiving controller reports a communication error, as shown at block 770.

In one or more examples, the control module 40 of the steering system 12 implements the technical solutions described herein. For example, the control module 40 receives and/or sends information according to the data format described herein. For example, the control module generates a data frame that packages information as described herein prior to transmitting the data frame to another ECU in the vehicle. Alternatively or in addition, the control module 40 receives a data frame as described herein. The control module determines validity of the data using the one or more fields in the data frame as described herein. If the control module 40 deems that the data frame has been received in a valid form, the control module continues to parse and use the data in the data frame. In case the control module 40 transmits the data frame, the receiving ECU conducts a validity check as described herein, prior to parsing and using the data sent by the control module 40.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A computer implemented method for inter-controller communication, the method comprising:
    generating, by a sending controller, a protocol agnostic data frame comprising a pattern identifier, a rolling counter, a message identifier, a signal group, a cyclic redundancy check (CRC), a complement of the pattern identifier, and a complement of the rolling counter, the pattern identifier indicating a start of the protocol agnostic data frame, and the complement of the pattern identifier and the complement of the rolling counter indicating an end of the protocol agnostic data frame;
    sending, by the sending controller, the protocol agnostic data frame to a first receiving controller that uses a first communication protocol, wherein the first receiving controller determines whether the protocol agnostic data frame is valid by:
        determining a result of an XOR operation between the pattern identifier and the compliment of the pattern identifier; and
        in response to the result of the XOR operation between the pattern identifier and the compliment of the pattern identifier indicating that the protocol agnostic data frame is not invalid, determining, based a result of an XOR operation between the rolling counter and the compliment of the rolling counter, whether the protocol agnostic data frame is valid;
    sending, by the sending controller, the protocol agnostic data frame to a second receiving controller that uses a second communication protocol, wherein the second receiving controller determines whether the protocol agnostic data frame is valid by:
        determining a result of an XOR operation between the pattern identifier and the compliment of the pattern identifier; and
        in response to the result of the XOR operation between the pattern identifier and the compliment of the pattern identifier indicating that the protocol agnostic data frame is not invalid, determining, based on a result of an XOR operation between the rolling counter and the compliment of the rolling counter, whether the protocol agnostic data frame is valid,
    in response to the first receiving controller determining that the result of the XOR operation between the rolling counter and the compliment of the rolling counter indicates that the protocol agnostic data frame is valid, repackaging by the first receiving controller, data indicted by signals from the protocol agnostic data frame according to the first communication protocol, wherein the first receiving controller accesses and uses the data indicated by signals in the first communication protocol; and
    in response to the first receiving controller determining that the result of the XOR operation between the rolling counter and the compliment of the rolling counter indicates that the protocol agnostic data frame is invalid and in response to the second receiving controller determining that the result of the XOR operation between the rolling counter and the compliment of the rolling counter indicates that the protocol agnostic data frame is valid receiving, from the second receiving controller by the first receiving controller, the protocol agnostic data frame and repackaging, by the first receiving controller, data indicted by signals from the protocol agnostic data frame according to the first communication protocol.

2. The computer implemented method of claim 1, wherein the sending controller uses a third communication protocol, distinct from the first and second communication protocols.

3. The computer implemented method of claim 1, wherein the protocol agnostic data frame is invalid in response to a result of an XOR operation of the pattern identifier and the pattern identifier complement not resulting in all ones.

4. The computer implemented method of claim 1, wherein the protocol agnostic data frame is invalid in response to a result of an XOR operation of the rolling counter and the rolling counter complement not resulting in all ones.

5. The computer implemented method of claim 1, wherein the protocol agnostic data frame is invalid in response to the rolling counter from the protocol agnostic data frame being less than or equal to a value of a rolling counter stored by a receiving controller.

6. The computer implemented method of claim 1, wherein the CRC comprises a CRC value based on the message identifier and the signal group from the protocol agnostic data frame.

7. The computer implemented method of claim 1, wherein the signal group comprises multiple signals, the message identifier indicating a number of the signals and a size of each signal.

8. The computer implemented method of claim 1, wherein the protocol agnostic data frame does not have a size limit.

9. The computer implemented method of claim 1, further comprising:
in response to the protocol agnostic data frame being valid:
extracting, by the first receiving controller, the signal group from the protocol agnostic data frame, the signal group comprising a plurality of signals; and
generating, by the first receiving controller, one or more messages according to the first communication protocol using the signals.

10. The computer implemented method of claim 9, further comprising:
checking, by the second receiving controller, validity of the protocol agnostic data frame;
in response to the protocol agnostic data frame being valid:
extracting, by the second receiving controller, the signal group from the protocol agnostic data frame, the signal group comprising the plurality of signals; and
generating, by the second receiving controller, one or more messages according to the second communication protocol using the signals.

11. A communication system comprising:
a first controller that uses a first communication protocol and that is configured to communicate with multiple receiving controllers in a protocol agnostic manner by:
generating a protocol agnostic data frame comprising a pattern identifier, a rolling counter, a message identifier, a signal group, a cyclic redundancy check (CRC), a complement of the pattern identifier, and a complement of the rolling counter, the pattern identifier indicating a start of the protocol agnostic data frame, and the complement of the pattern identifier and the complement of the rolling counter indicating an end of the protocol agnostic data frame;
sending the protocol agnostic data frame to a second controller that uses a second communication protocol, wherein the second controller determines whether the protocol agnostic data frame is valid by:
determining a result of an XOR operation between the pattern identifier and the compliment of the pattern identifier;
in response to the result of the XOR operation between the pattern identifier and the compliment of the pattern identifier indicating that the protocol agnostic data frame is not invalid, determining, based on a result of an XOR operation between the rolling counter and the compliment of the rolling counter, whether the protocol agnostic data frame is valid; and
sending the protocol agnostic data frame to a third controller that uses a third communication protocol, wherein the third controller determines whether the protocol agnostic data frame is valid by:
determining a result of an XOR operation between the pattern identifier and the compliment of the pattern identifier; and
in response to the result of the XOR operation between the pattern identifier and the compliment of the pattern identifier indicating that the protocol agnostic data frame is not invalid, determining, based on a result of an XOR operation between the rolling counter and the compliment of the rolling counter, whether the protocol agnostic data frame is valid;
in response to the second controller determining that the result of the XOR operation between the rolling counter and the compliment of the rolling counter indicates that the protocol agnostic data frame is valid, repackaging, by the second controller, data indicted by signals from the protocol agnostic data frame according to the first communication protocol, wherein the second controller accesses and uses the data indicated by signals in the second communication protocol; and
in response to the second controller determining that the result of the XOR operation between the rolling counter and the compliment of the rolling counter indicates that the protocol agnostic data frame is invalid and in response to the third controller determining that the result of the XOR operation between the rolling counter and the compliment of the rolling counter indicates that the protocol agnostic data frame is valid receiving, from the third controller by the second controller, the protocol agnostic data frame and repackaging, by the second controller, data indicted by signals from the protocol agnostic data frame according to the second communication protocol.

12. The communication system of claim 11, wherein the protocol agnostic data frame is invalid in response to a result of an XOR operation of the pattern identifier and the pattern identifier complement not resulting in all ones.

13. The communication system of claim 11, wherein the protocol agnostic data frame is invalid in response to a result of an XOR operation of the rolling counter and the rolling counter complement not resulting in all ones.

14. The communication system of claim 11, wherein the CRC comprises a CRC value based on the message identifier and the signal group from the protocol agnostic data frame.

15. The communication system of claim 11, wherein
in response to the protocol agnostic data frame being valid:
extracting the signal group from the protocol agnostic data frame, the signal group comprising a plurality of signals; and
generating one or more messages according to the second communication protocol using the signals.

16. A computer program product comprising non-transitory computer readable medium having computer executable instructions, the computer executable instructions causing controllers in a communication system to communicate in a protocol agnostic manner by:
generating, by a first controller that uses a first communication protocol, a protocol agnostic data frame comprising a pattern identifier, a rolling counter, a message identifier, a signal group, a cyclic redundancy check (CRC), a complement of the pattern identifier, and a complement of the rolling counter, the pattern identifier indicating a start of the protocol agnostic data frame, and the complement of the pattern identifier and the complement of the rolling counter indicating an end of the protocol agnostic data frame;
sending, by the first controller, the protocol agnostic data frame to a second controller that uses a second communication protocol, wherein the second controller determines whether the protocol agnostic data frame is valid by:
determining a result of an XOR operation between the pattern identifier and the compliment of the pattern identifier; and
in response to the result of the XOR operation between the pattern identifier and the compliment of the pattern identifier indicating that the protocol agnostic data frame is not invalid, determining, based on a result of an XOR operation between the rolling counter and the compliment of the rolling counter, whether the protocol agnostic data frame is valid; and sending, by the first controller, the protocol agnostic data frame to a third controller that uses a third communication protocol, wherein the third controller determines whether the protocol agnostic data frame is valid by:
  determining a result of an XOR operation between the pattern identifier and the compliment of the pattern identifier; and
  in response to the result of the XOR operation between the pattern identifier and the compliment of the pattern identifier indicating that the protocol agnostic data frame is not invalid, determining, based on a result of an XOR operation between the rolling counter and the compliment of the rolling counter, whether the protocol agnostic data frame is valid;

in response to the second controller determining that the result of the XOR operation between the rolling counter and the compliment of the rolling counter indicates that the protocol agnostic data frame is valid, repackaging, by the second controller, data indicted by signals from the protocol agnostic data frame according to the first communication protocol, wherein the second controller accesses and uses the data indicated by signals in the second communication protocol; and in response to the second controller determining that the result of the XOR operation between the rolling counter and the compliment of the rolling counter indicates that the protocol agnostic data frame is invalid and in response to the third controller determining that the result of the XOR operation between the rolling counter and the compliment of the rolling counter indicates that the protocol agnostic data frame is valid receiving, from the third controller by the second controller, the protocol agnostic data frame and repackaging by the second controller, data indicted by signals from the protocol agnostic data frame according to the second communication protocol.

17. The computer program product of claim 16, wherein the protocol agnostic data frame is invalid in response to:
  a result of an XOR operation of the pattern identifier and the pattern identifier complement not resulting in all ones; and
  a result of an XOR operation of the rolling counter and the rolling counter complement not resulting in all ones.

18. The computer program product of claim 16, wherein the CRC comprises a CRC value based on the message identifier and the signal group from the protocol agnostic data frame.

19. The computer program product of claim 16, wherein the signal group comprises multiple signals, the message identifier indicating a number of the signals and a size of each signal.

20. The computer program product of claim 16, wherein the computer executable instructions cause the controllers in the communication system to:
  in response to the protocol agnostic data frame being valid:
    extracting, by the second controller, the signal group from the protocol agnostic data frame, the signal group comprising a plurality of signals; and
    generating, by the second controller, one or more messages according to the second communication protocol using the signals.

* * * * *